United States Patent

Naderhirn

Patent Number: 5,888,560
Date of Patent: Mar. 30, 1999

[54] INJECTION MOLDING MACHINE WITH C-SHAPED FRAME

[75] Inventor: Helmut Naderhirn, Perg, Austria

[73] Assignee: Engel Maschinenbau Gesellschaft M.B.H., Schwertberg, Austria

[21] Appl. No.: 817,815

[22] PCT Filed: Oct. 13, 1995

[86] PCT No.: PCT/AT95/00201

§ 371 Date: Apr. 10, 1997

§ 102(e) Date: Apr. 10, 1997

[87] PCT Pub. No.: WO96/11785

PCT Pub. Date: Apr. 25, 1996

[30] Foreign Application Priority Data

Oct. 14, 1994 [AT] Austria ................................. 1950/94

[51] Int. Cl.⁶ ................................................. B29C 45/66
[52] U.S. Cl. ................................................. 425/589
[58] Field of Search ................................. 425/589, 592, 425/593

[56] References Cited

U.S. PATENT DOCUMENTS 5,538,415  7/1996  Reinhart et al. ................. 425/589
5,556,656  9/1996  Lampl et al.
5,578,329  11/1996 Hehl ............................... 425/593
5,650,182  7/1997  Fuller et al.

FOREIGN PATENT DOCUMENTS 9402825    6/1994  Germany.
4320366   12/1994  Germany.
WO 9504643 2/1995  WIPO.

Primary Examiner—Tim Heitbrink
Attorney, Agent, or Firm—Notaro & Michalos P.C.

[57] ABSTRACT

An injection molding machine has a C-shaped machine frame with stationary die platen mounted on one limb and a closure mechanism mounted on the other for driving a movable die platen. The free ends of the machine frame limbs, whose ends are not connected by spars, deform under the influence of a closure force occurring during a closure process. Disposed between the stationary die platen and/or the closure mechanism, and the machine frame is at least one retaining part which deforms rather than pivoting, when the closure force is applied. The stationary die platen or the closure mechanism is thus tilted relative to the machine frame.

18 Claims, 3 Drawing Sheets

_5,888,560_

INJECTION MOLDING MACHINE WITH C-SHAPED FRAME

FIELD AND BACKGROUND OF THE INVENTION

The invention relates to an injection molding machine comprising a substantially C-shaped machine frame, on one limb of which is mounted a stationary mold mounting plate and on the other limb of which is mounted a closing mechanism for driving a movable mold mounting plate, wherein the free ends of the limbs of the machine frame, which are not connected by beam members, deform under the influence of the closing force which occurs during the closing operation.

An injection molding machine of that kind is known for example from DE-U1-92 12 480. The object of the invention is to simplify the construction and nonetheless to provide for good guidance of the mold mounting plates and absolute parallelism of the two mold halves, even when very high mold driving forces are involved.

SUMMARY OF THE INVENTION

The object according to the invention is attained in that arranged between the stationary mold mounting plate and/or the closing mechanism on the one hand and the machine frame on the other hand is at least one holding portion which is deformed when the closing force is applied whereby the stationary mold mounting plate or the closing mechanism is tilted relative to the machine frame.

Such a design configuration makes it possible to avoid the pivot trunnions which were used hitherto in relation to injection molding machines without connecting beam members. If, in an injection molding machine according to the invention, the two limbs of the machine frame pivot outwardly about notional lower axes of rotation under the influence of the closing force, the stationary mold mounting plate and/or the closing mechanism mutually pivot about notional upper pivot axes.

The invention can be embodied by means of different structures. In that respect the only essential consideration is that the deformation of the connecting region of the stationary mold mounting plate or closing mechanism on the one hand and the machine frame on the other hand, as is produced by the closing force, at least approximately compensates for expansion of the machine frame which is open at the top.

Preferably the holding portions as well as the machine frame comprise steel. The holding portions however do not have to be in one piece with the machine frame but can be in the form of separate components. That affords the possibility of making holding portions and machine frame from different material and in particular making the elasticity of the holding portions greater than that of the machine frame.

BRIEF DESCRIPTION OF THE DRAWINGS

Various embodiments of the invention are described in detail hereinafter with reference to the Figures of the accompanying drawings.

DESCRIPTION OF THE PREFERRED EMBODIMENT

Figure 1:
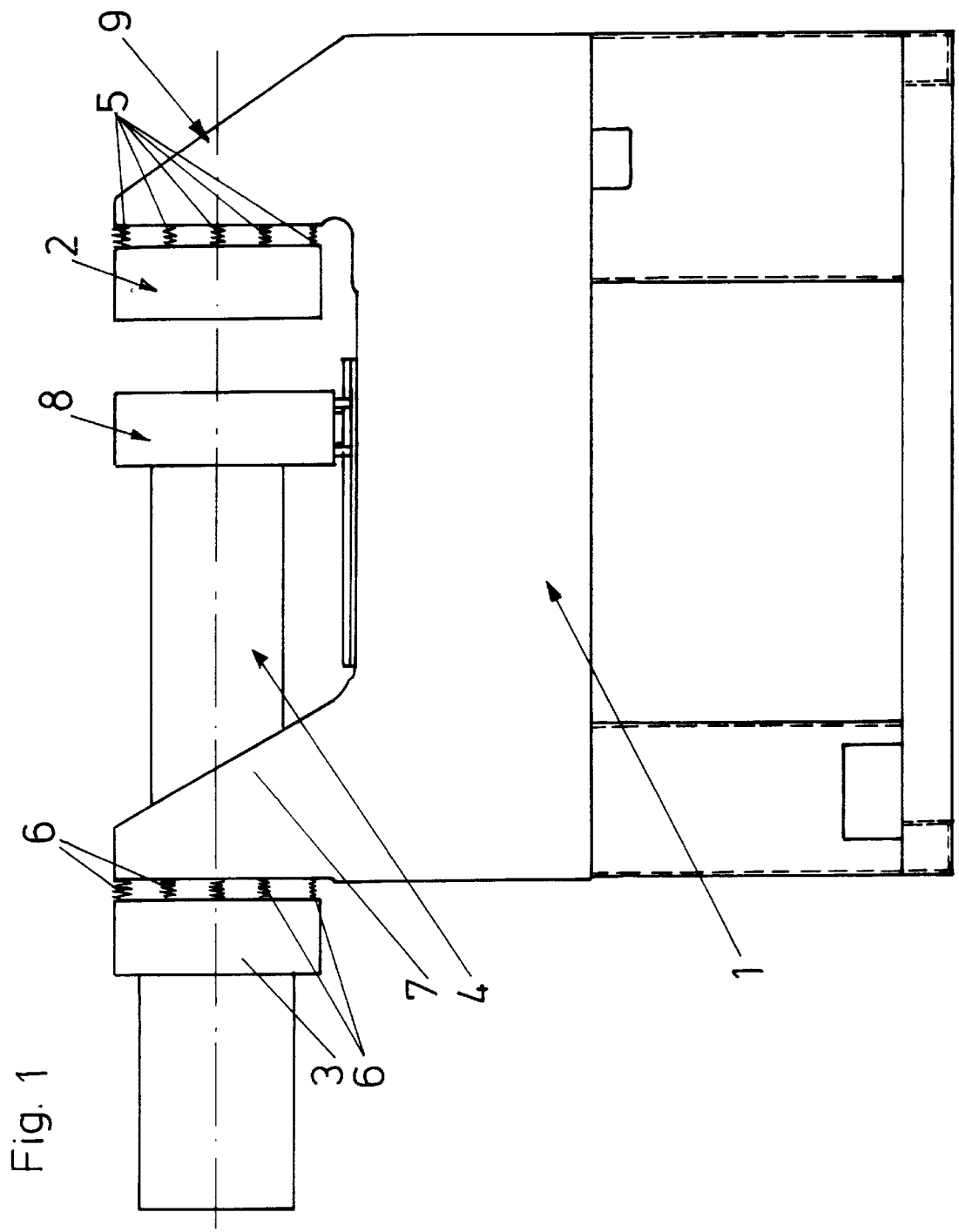
FIG. 1 is a diagrammatic side view of an injection molding machine according to the invention and FIGS. 2 and 3 each diagrammatically show side views of the stationary mold mounting plate and the associated part of the machine frame.

The essential part of the injection molding machine is the machine frame 1 which carries the stationary mold mounting plate 2 by way of a frame limb 9 and a flange 3 of the closing mechanism 4 by way of a frame limb 7.

In the illustrated embodiment the closing mechanism is a hydraulic piston-cylinder unit. It would however also be possible to provide an electromechanical closing mechanism, for example also a bell crank mechanism. The movable mold mounting plate 8 is displaced by way of the closing mechanism 4.

In the embodiment shown in FIG. 1 both the stationary mold mounting plate 2 and also the closing mechanism 4 are mounted on the machine frame 1 by means of a plurality of separate holding portions 5, 6. In the illustrated embodiment the holding portions 5 between the stationary mold mounting plate 2 and the machine frame are loaded in compression and the holding portions 6 between the drive plate 3 and the machine frame 1 are loaded in tension. It would however also be possible for the flange 3 of the closing mechanism 4 to be mounted at the inside of the frame limb 7, that is to say at the side towards the mold mounting plates 2, 8 so that the holding portions 6 would also be loaded in compression. The holding portions 5, 6 which are distributed over the height of the mold mounting plate 2 and the flange 3 respectively are of different strengths (higher elasticity), the lower holding portions 5, 6 being of lower strength than the upper holding portions 5, 6.

If the limbs 7, 9 of the machine frame 1 are urged away from each other at the top the stationary mold mounting plate 2 and/or the closing mechanism 4 can perform a tilting movement relative to the machine frame 1 whereby plate parallelism of the mold mounting plates 2, 8 is maintained.

The differing strength or elasticity of the holding portions 5, 6 can be achieved by virtue of different configurations. Thus the holding portions 5, 6 may be of different dimensions or they may be provided with material weakenings, for example slots.

The differing elasticity and strength can likewise be achieved by the use of different materials. The holding portions are advantageously made from steel, in particular spring steel.

Figure 3:
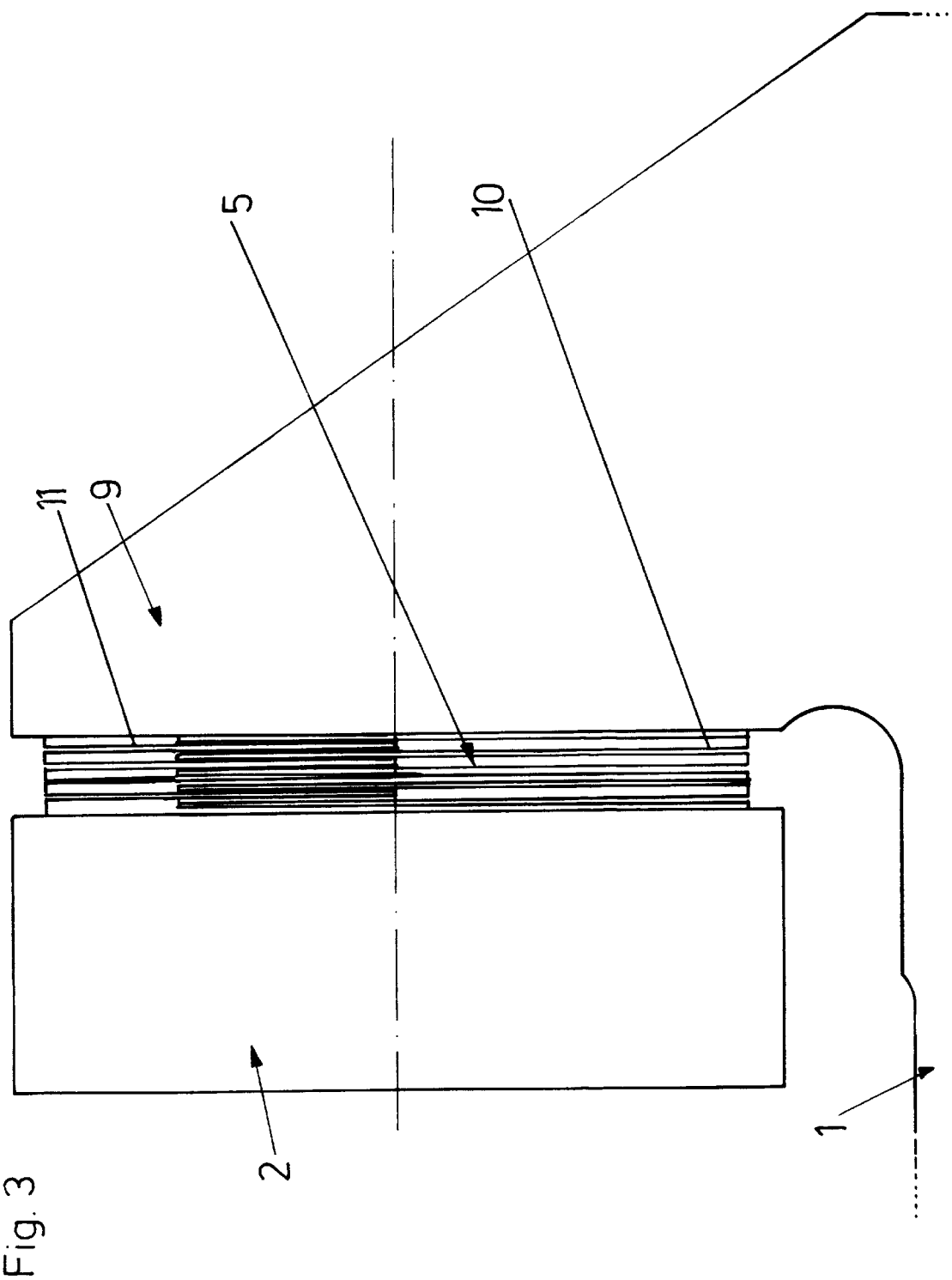

The embodiment shown in FIG. 3 has only one holding portion 5 which carries the stationary mold mounting plate 2. That holding portion 5 is provided at the bottom side with relatively deep slots 10 and at the top side with slots 11 of lesser depth. The slots 10, 11 overlap so that the holding portion 5 is compressible in a harmonica-like manner. In that way the holding portion 5 is compressed to a greater degree at the bottom side than at the top side and, if the machine frame 1 is deformed under the application of the closing force and the frame limb 9 tilts outwardly, the stationary mold mounting plate 2 can perform a tilting movement relative to the frame limb 9 or relative to the machine frame 1.

The holding portion 5 could also be of a concertina-like configuration.

Figure 2:
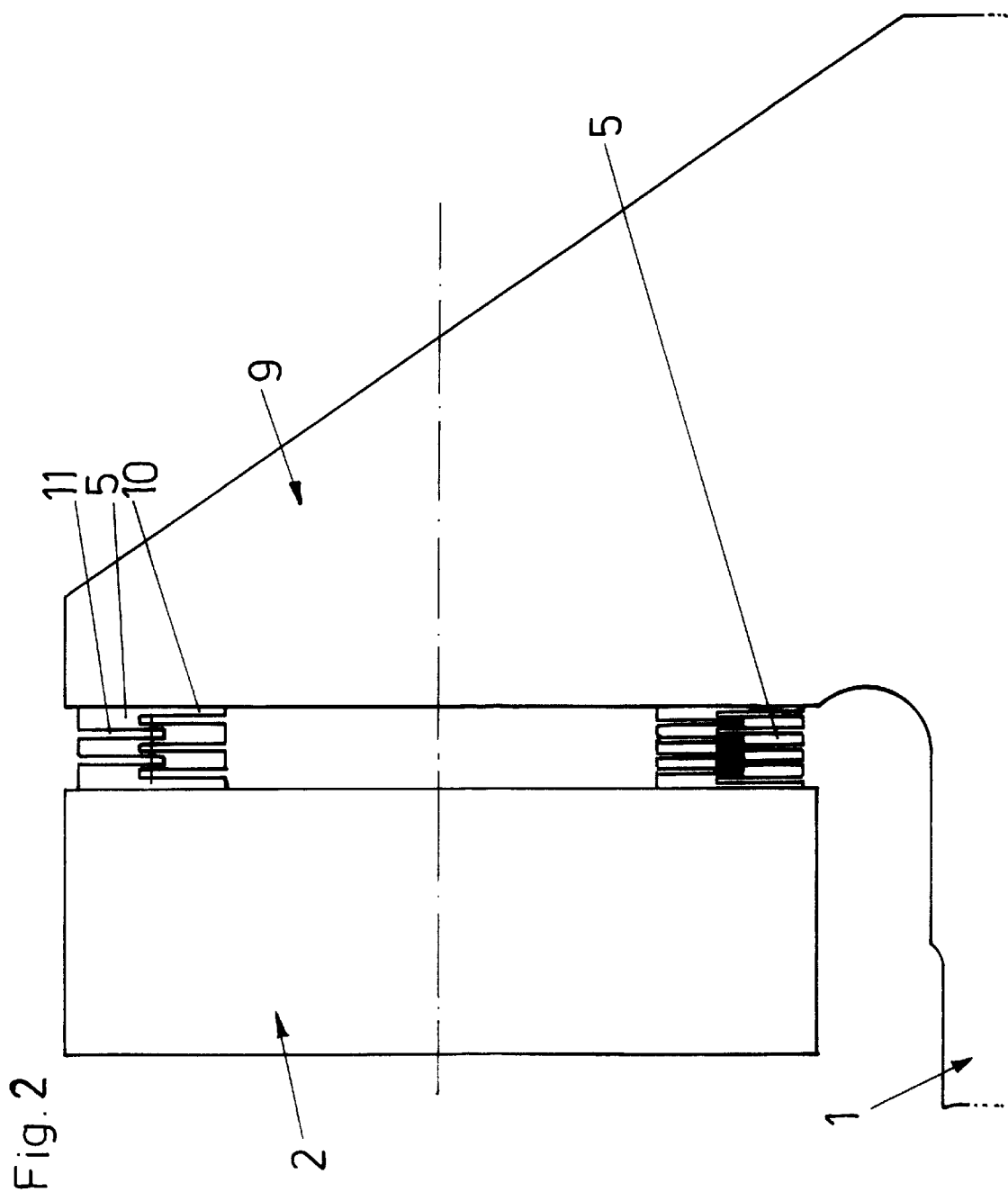

In the embodiment shown in FIG. 2 the stationary mold mounting plate 2 is mounted on the machine frame 1 by means of two holding portions 5, wherein both holding portions 5 are provided with slots 10, 11 but the lower holding portion 5 has more slots 10, 11 or deeper slots 10, 11 than the upper holding portion 5 and is therefore of lower strength.

The slots 10, 11 in the holding portions 5, 6 advantageously extend at a right angle to the longitudinal axis of the machine.

The holding arrangement shown in the embodiment of FIG. 2 for the stationary mold mounting plate 2 could also be used as a holding arrangement for the closing mechanism 4.

The separate holding portions 5, 6 between the machine frame 1 and the stationary mold mounting plate 2 or the closing mechanism 4 respectively form an axis-less hinge or pivot which besides the rotary movement also permits a translatory movement.

I claim:

1. An injection molding machine comprising: a substantially C-shaped machine frame having a pair of limbs each with a free end; a stationary mold mounting plate mounted on one of said limbs; a closing mechanism for driving a movable mold mounting plate against the stationary mold mounting plate with a closing force during a closing operation, mounted on the other of said limbs, the free ends of the limbs being deformable under influence of the closing force; and at least one holding portion which is free of any pivot trunnion, mounted between the stationary mold mounting plate and the machine frame, said holding portion being deformed when the closing force is applied so that the stationary mold mounting plate is tilted relative to the machine frame.

2. An injection molding machine comprising: a substantially C-shaped machine frame having a pair of limbs each with a free end; a stationary mold mounting plate mounted on one of said limbs; a closing mechanism for driving a movable mold mounting plate against the stationary mold mounting plate with a closing force during a closing operation, mounted on the other of said limbs, the free ends of the limbs being deformable under influence of the closing force; and at least one holding portion which is free of any Divot trunnion, mounted between the closing mechanism and the machine frame, said holding portion being deformed when the closing force is applied so that the closing mechanism is tilted relative to the machine frame.

3. An injection molding machine comprising: a substantially C-shaped machine frame having a pair of limbs each with a free end; stationary mold mounting plate mounted on one of said limbs; a closing mechanism for driving a movable mold mounting plate against the stationary mold mounting plate with a closing force during a closing operation, mounted on the other of said limbs, the free ends of the limbs being deformable under influence of the closing force; and at least one holding portion which is free of any pivot trunnion, mounted between the machine frame and at least one of: the stationary mold mounting plate and the closing mechanism, said holding portion being deformed when the closing force is applied so that the at least one of the stationary mold mounting plate and the closing mechanism is tilted relative to the machine frame.

4. The injection molding machine as set forth in claim 1, claim 2 or claim 3 wherein the holding portion is made of steel.

5. The injecting molding machine as set forth in claim 1, claim 2 or claim 3 wherein at least one holding portion is in the form of a component which is separate from the machine frame.

6. The injection molding machine as set forth in claim 1, claim 2 or claim 3 wherein the holding portion and the machine frame are made from different material.

7. The injection molding machine as set forth in claim 1, claim 2 or claim 3 wherein said at least one holding portion comprises at least two holding portions of different strengths spaced vertically with respect to each other on the machine frame.

8. The injection molding machine as set forth in claim 7 wherein said holding portions are made of spring steel.

9. The injection molding machine as set forth in claim 7 wherein the holding portions are of different dimensions.

10. The injection molding machine as set forth in claim 1, claim 2 or claim 3 wherein the holding portion contains different material weakenings.

11. The injection molding machine as set forth in claim 1, claim 2 or claim 3 wherein the holding portion comprises a cylinder or block having an underside and a plurality of slots extending into the underside for permitting the holding portion to deform.

12. The injection molding machine as set forth in claim 11 wherein the holding portion is also provided with slots at a top side of said holding portion, a depth of said slots in the top side being less than a depth of the slots at the underside.

13. An injection molding machine comprising: a substantially C-shaped machine frame having one limb and another limb, said limbs each having a free end; a stationary mold mounting plate mounted to said one limb; a closing mechanism for driving a movable mold mounting plate mounted to said other limb, the free ends of the limbs of the machine frame, which are not connected by beam members, deform under the influence of a closing force which occurs during a closing operation; and a non-pivoting deformable joint connected between the stationary mold mounting plate and the machine frame which is deformed when the closing force is applied whereby the stationary mold mounting plate is tilted relative to the machine frame.

14. An injection molding machine comprising: a substantially C-shaped machine frame having one limb and another limb, said limbs each having a free end; a stationary mold mounting plate mounted to said one limb; a closing mechanism for driving a movable mold mounting plate mounted to said other limb, wherein the free ends of the limbs of the machine frame, which are not connected by beam members, deform under the influence of a closing force which occurs during a closing operation; and a non-pivoting deformable joint connected between the closing mechanism and the machine frame which is deformed when the closing force is applied whereby the closing mechanism is tilted relative to the machine frame.

15. An injection molding machine comprising: a substantially C-shaped machine frame having one limb and another limb, said limbs each having a free end; a stationary mold mounting plate mounted to said one limb; a closing mechanism for driving a movable mold mounting plate mounted to said other limb, wherein the free ends of the limbs of the machine frame, which are not connected by beam members, deform under the influence of a closing force which occurs during a closing operation; and a non-pivotal deformable joint between at least one of: the stationary mold mounting plate and the closing mechanism; and the machine frame which is deformed when the closing force is applied whereby the stationary mold mounting plate or the closing mechanism is tilted relative to the machine frame.

16. The injection molding machine as set forth in claim 13, claim 14 or claim 15 wherein joint is free of any pivot shaft.

17. An open frame injection molding machine comprising: a frame that supports a stationary mold mounting surface, a movable mold mounting surface that is essentially parallel to the stationary mold mounting surface, and a closing mechanism, wherein at least one non-pivotal, deformable holding portion of the frame is geometrically configured to maintain a relatively constant moment of inertia relative to a line of force applied by the closing mechanism during a molding cycle, so that the two mold mounting surfaces remain essentially parallel throughout the molding cycle by a relative tilting of at least one of the mounting surfaces with respect to the frame through a deformation of said holding portion.

18. An injection molding machine comprising: a machine frame; a stationary mold mounting plate; a movable mold mounting plate; and a closing mechanism for driving the movable mold mounting plate to close a mold formed by the mold mounting plates under a closing force and during a step of closing the mold; regions of said machine frame being bent outwardly due to the closing force during the step of closing the mold; said mold mounting plates being articulated to said frame by at least one non-pivoting and deformable holding portion so that said plates remain parallel with respect to one another despite the fact that said machine frame regions are bent outwardly; and said holding portion being between at least one of said mold mounting plates and one of said outwardly bent regions of the machine frame which is bent when the closing force is applied, so that said at least one mold mounting plate is tilted with respect to said at least one outwardly bent region of the machine frame, without the use of pivot pins.

* * * * *